United States Patent [19]
Glinter et al.

[11] Patent Number: 5,775,763
[45] Date of Patent: Jul. 7, 1998

[54] VEHICLE SEAT CONNECTIVE ARRANGEMENT

[75] Inventors: Jeffrey Alan Glinter, Waterford; Kevin John Van Nieulande, Fraser, both of Mich.

[73] Assignee: General Motors Corporation, Detroit, Mich.

[21] Appl. No.: 579,486

[22] Filed: Dec. 27, 1995

[51] Int. Cl.⁶ .................................................. B60N 2/04
[52] U.S. Cl. ........................... 296/65.1; 297/378.12; 297/335
[58] Field of Search ................. 296/65.1; 297/378.12, 297/335, 334, 336, 354.12, 361.1

[56] References Cited

U.S. PATENT DOCUMENTS

| | | | |
|---|---|---|---|
| 3,880,464 | 4/1975 | Murphy et al. | 297/326 |
| 4,209,159 | 6/1980 | Becker et al. | 248/430 |
| 4,438,974 | 3/1984 | Kresky et al. | 297/379 |
| 4,484,776 | 11/1984 | Gokimoto et al. | 296/65 R |
| 4,627,656 | 12/1986 | Gokimoto et al. | 296/65 R |
| 4,700,989 | 10/1987 | Ercilla | 297/331 |
| 4,743,066 | 5/1988 | Boisset et al. | 297/339 |
| 4,773,693 | 9/1988 | Premji et al. | 296/65.1 |
| 4,865,377 | 9/1989 | Musser et al. | 296/65.1 |
| 4,881,827 | 11/1989 | Borlinghaus et al. | 384/47 |
| 4,925,229 | 5/1990 | Siebler | 296/65.1 |
| 4,978,158 | 12/1990 | Kubo et al. | 296/65.1 |
| 4,988,134 | 1/1991 | Vidwans et al. | 292/198 |
| 5,011,209 | 4/1991 | Takarabe et al. | 296/65.1 |
| 5,020,853 | 6/1991 | Babbs | 297/341 |
| 5,094,487 | 3/1992 | Drewry | 292/237 |
| 5,207,480 | 5/1993 | Johnson et al. | 297/344 |
| 5,238,285 | 8/1993 | Holdampf et al. | 296/65.1 |
| 5,280,987 | 1/1994 | Miller | 296/65.1 |
| 5,282,662 | 2/1994 | Bolsworth et al. | 296/65.1 |
| 5,393,116 | 2/1995 | Bolsworth et al. | 296/65.1 |
| 5,482,345 | 1/1996 | Bolsworth et al. | 296/65.1 |
| 5,577,805 | 11/1996 | Glinter et al. | 296/65.1 X |

FOREIGN PATENT DOCUMENTS 57-104425  6/1982  Japan.

*Primary Examiner*—Joseph D. Pape
*Attorney, Agent, or Firm*—Patrick M. Griffin; Ernest E. Helms

[57] ABSTRACT

An arrangement for connecting a vehicle seat in at least two positions is provided. The arrangement includes a floor first surface; a cross pin having a cross section with a first larger width and a second smaller width; a chair leg having a slot which has a first end wider than the cross pin first width, the slot also having a neck and a closure section divided away from the slot first end by the neck, the closure section having a dimension less than the cross pin first width and greater than the cross pin second width; and a lock arm with a finger for locking on to the pin about the second width to entrap the pin in the closure section of the slot. Thus, in a normal first seating position, the seat leg is positioned to place the cross pin in close proximity to the neck of the slot, and in a second fold-up storage position, the seat leg is held in a second position extending more vertically upward than in the first position by the latch locking on to the second width of the cross pin.

9 Claims, 5 Drawing Sheets

VEHICLE SEAT CONNECTIVE ARRANGEMENT

FIELD OF THE INVENTION

The field of the present invention is that of vehicle seats, particularly van-type vehicle seats having a normal seating position and an upright storage position.

BACKGROUND OF THE INVENTION

Many vans and minivans have detachable seating. Not only are the seats removable from the vehicle van floor, but typically the vehicle seat will also have a normal seating position, a seat back fold-down position, and an upright storage position wherein the rear seat legs of the vehicle seat are detached from the vehicle floor and the seat stands up on its first legs. Examples of such vehicle seats may be found in a review of U.S. Pat. Nos. 5,393,116, Bosworth et al and 5,482,345, Bosworth et al, both commonly assigned.

SUMMARY OF THE INVENTION

The present invention provides an inventive seat and a connective arrangement thereof primarily useful for the front seat legs of a van-type vehicle seat which can be utilized as an alternative to the front leg connective arrangement described in the aforementioned references.

DESCRIPTION OF THE PREFERRED EMBODIMENT

Figure 1:
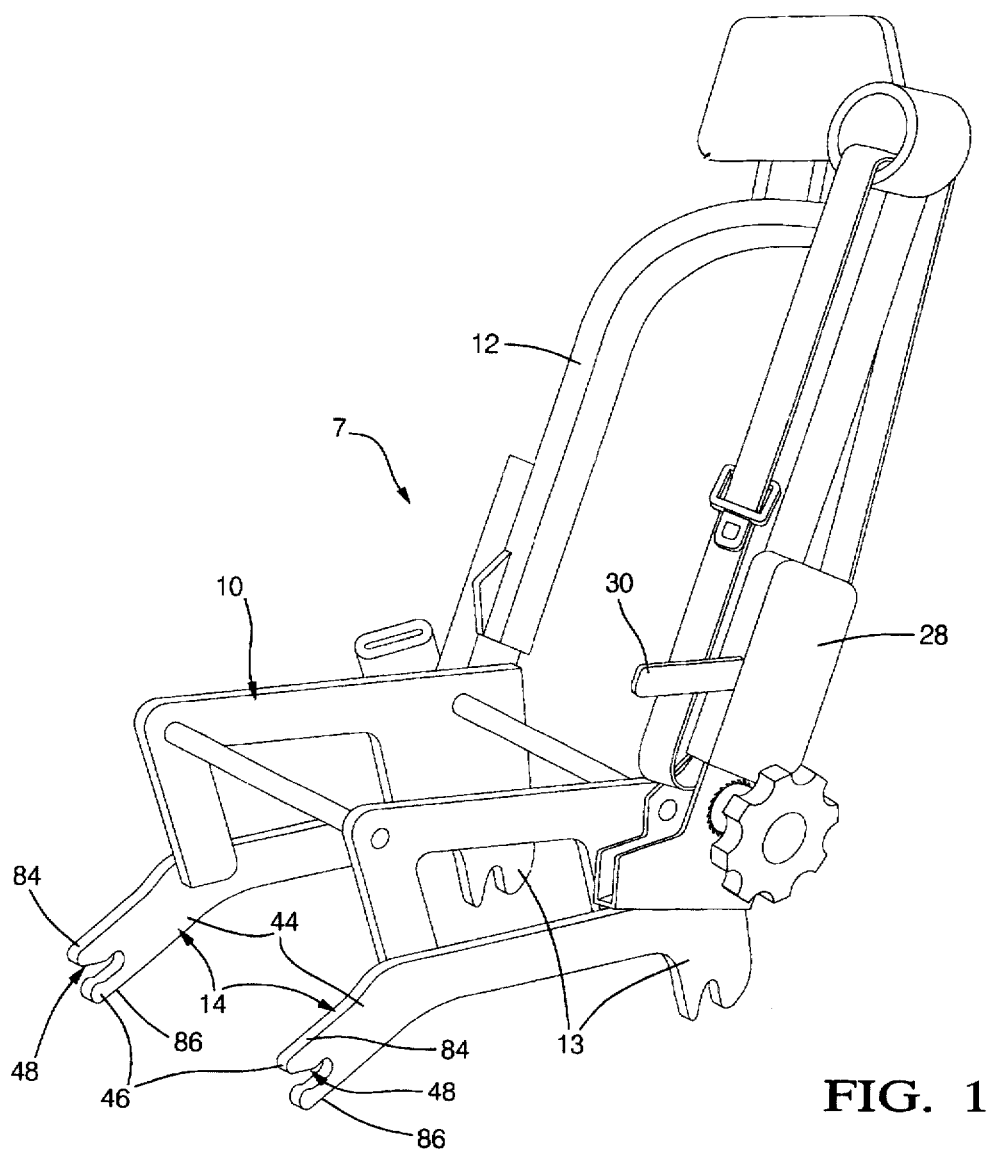
FIG. 1 is a perspective view of a preferred embodiment of a vehicle seat according to the present invention with the upholstery material removed for clarity of illustration.
Figure 2:
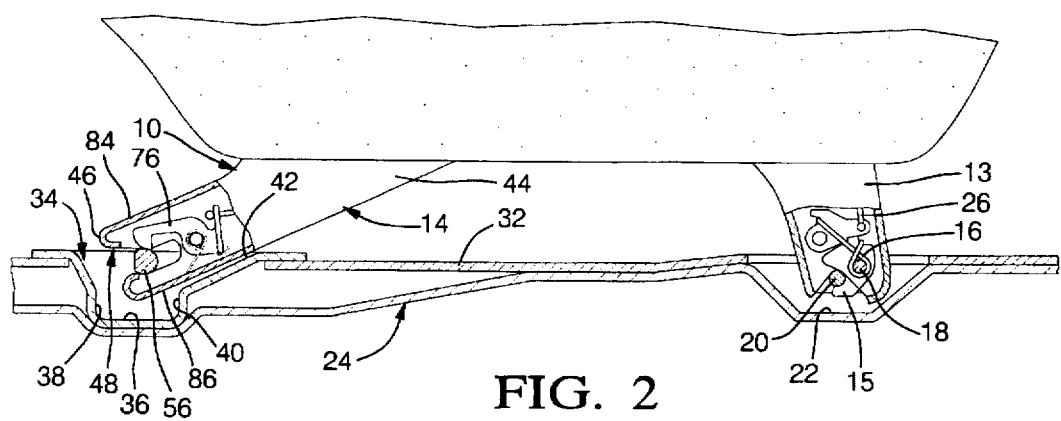
FIG. 2 is a side elevational view partially sectioned of the vehicle seat shown in FIG. 1 with the connective arrangement of the present invention.

Referring to FIGS. 1–5, a vehicle seat 7 has a bun platform 10 with a pivotally connected seat back 12. The bun frame 10 has a pair of rear legs or risers 13 and front legs or risers 14. Each rear leg 13 has a fork bolt 15 which is biased by a spring 16 to pivot clockwise around a pin 18 to grasp a cross pin 20 which is located within a pocket 22 of a vehicle floor 24. The fork bolt 15 may be released from the cross pin 20 by an appropriate pull on a rod or cable 26 via a latch arrangement 28 similar to that provided in the aforementioned Bosworth U.S. Pat. No. 5,393,116 as manipulated by a hand lever 30. When the seat 7 is in a normal seating position as shown in FIGS. 1, 2, 3A and 4A, the rear legs 13 are constrained in both a fore and aft direction in the horizontal and in an up and down direction in the vertical. Appropriate lateral contact with optional radial walls (not shown) of the cross pin 20 or along a lateral side of the rear leg 13 by a portion of the floor 24 maintains lateral seat position in a direction transverse the seat 7 in the vehicle.

The vehicle floor 24 along its front end has a top surface 32. Fixably connected by appropriate fasteners or welding to the top surface 32 is a pocket member 34. Pocket 34 has a base 36 along with two generally perpendicular extending side walls 38 and 40. Side wall 40 additionally has a portion inclined toward the rear leg 13, providing an inclined surface 42.

The front legs 14 have one end 44 connected to the remainder of the frame 10 and a second end 46. The second end 46 has a slot 48 with a first end 50, a throat or neck region 52, and capture section 54 (see FIG. 5).

Mounted within the pocket 34 is a cross pin 56. The cross pin 56 has a flat 58. Along the cross pin main diameter 60, it has a first larger width, and along the flat 58, it has a second smaller width or diameter 62 (see FIG. 5).

The slot first section 50 will be larger than the diameter 60, allowing entry of the cross pin 56. Cross pin 56 will not normally be allowed to enter the capture section as shown in its normal seating position in FIGS. 1, 2, 3A and 4A due to the fact that the neck 52 is smaller than the width 60. The width 62 will be closely adjacent to the neck 52. In a normal seating position, the cross pin 56 will be captured between sides 70 and 72 of the front leg. Therefore, the seat 7 will be restrained from further forward movement but will be unrestrained from rearward movement. However, since the rear leg 12 is secured to the cross pin 20, the seat will be secured.

Figure 3A:
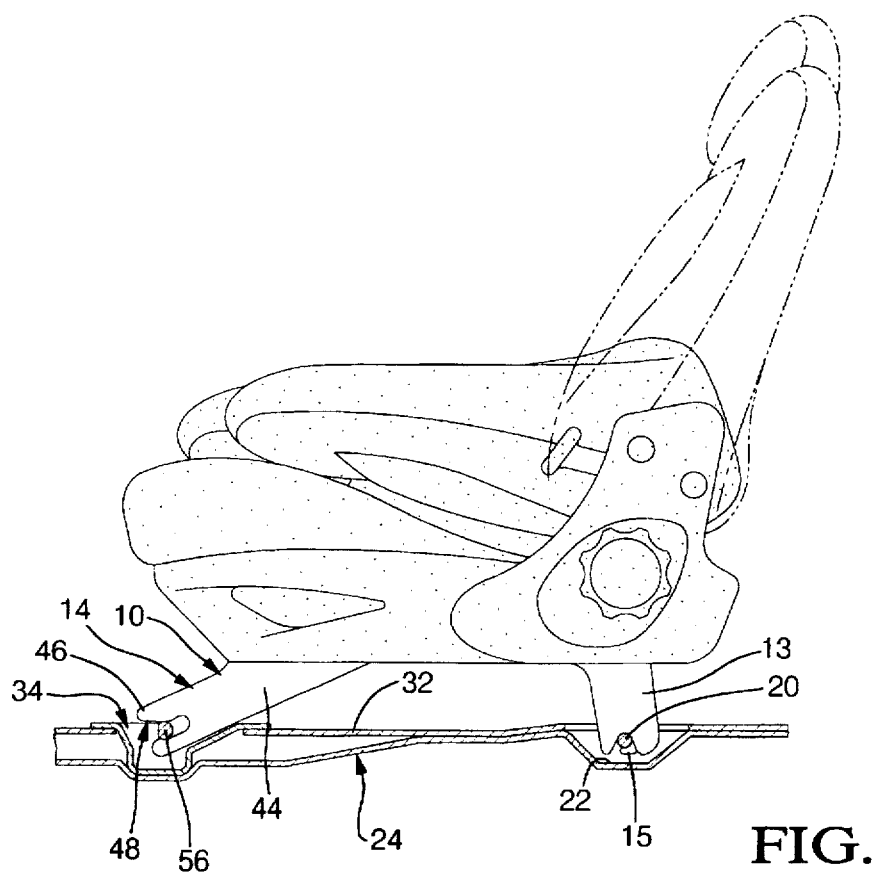
FIGS. 3A, 3B and 3C are side elevational views with relevant portions sectioned demonstrating operation of the vehicle seat from its normal position to its upright storage position.
Figure 3B:
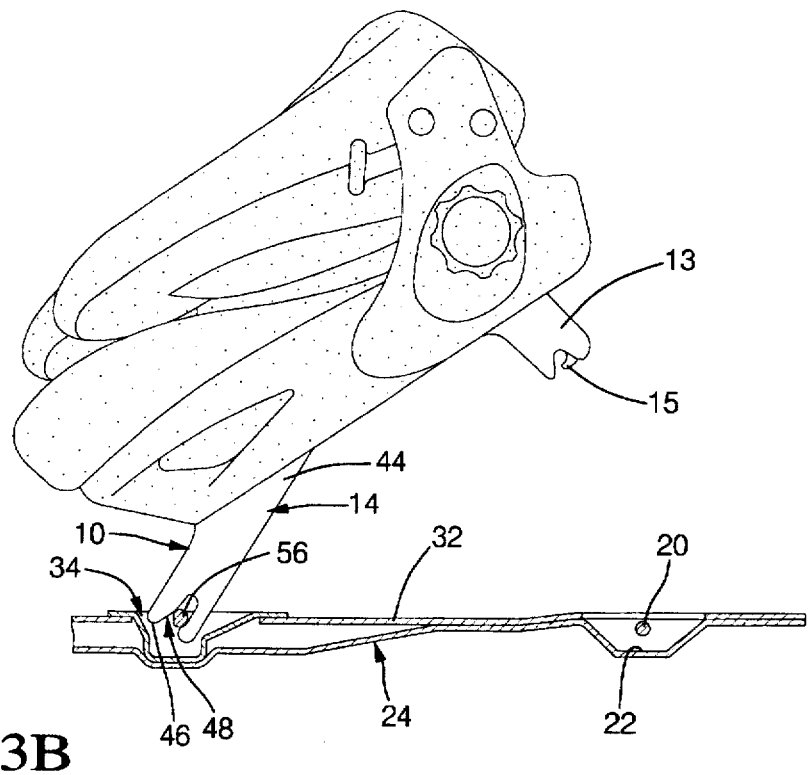
Figure 3C:
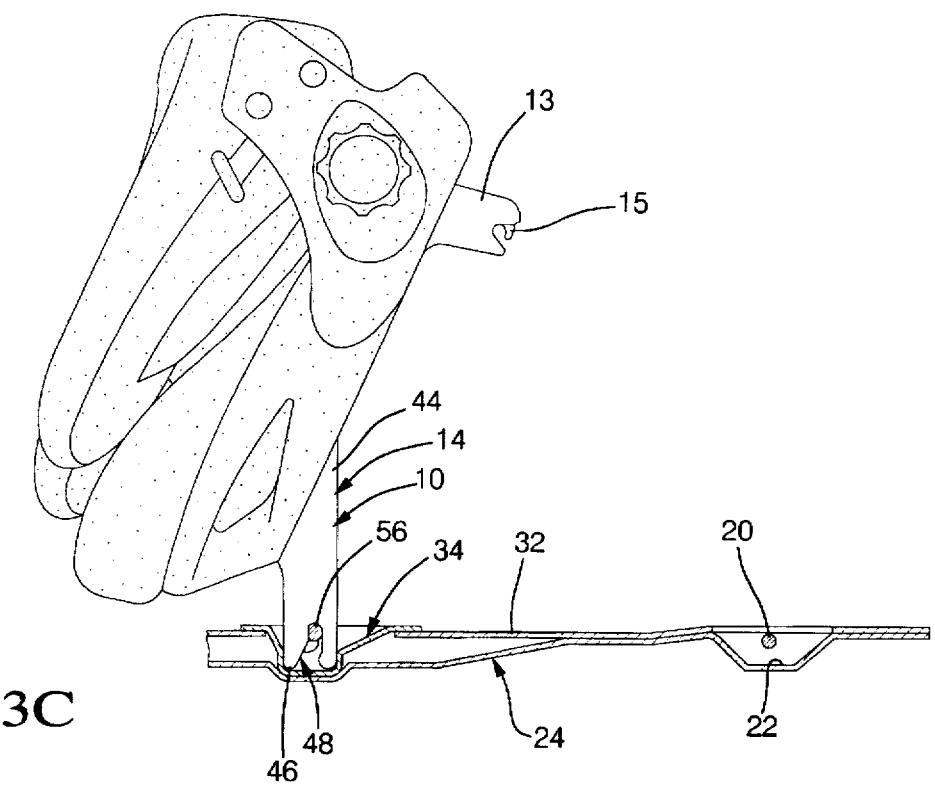
Figure 4A:
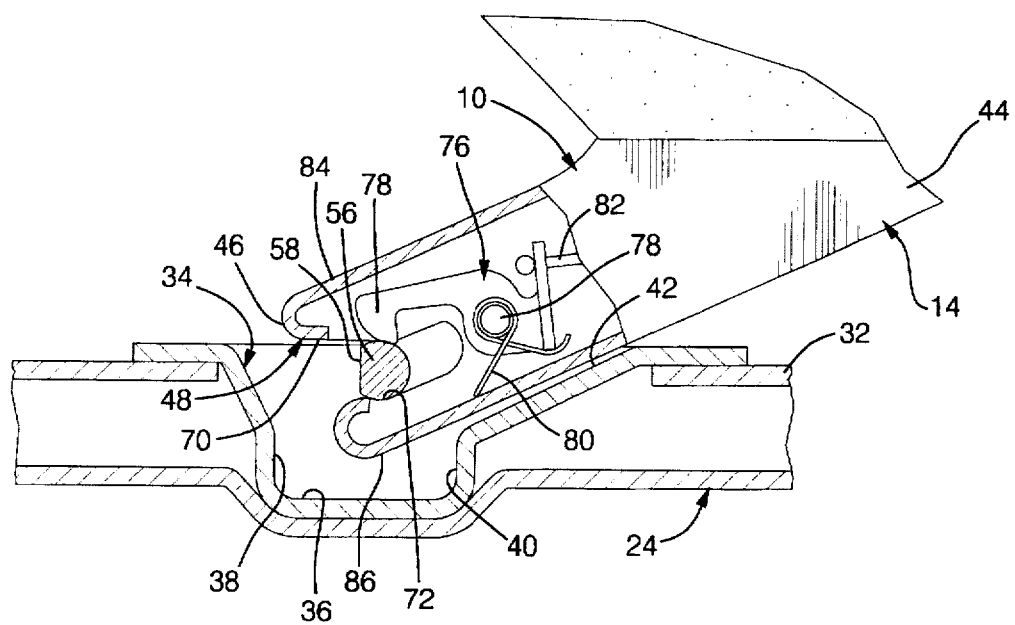
FIGS. 4A, 4B and 4C are enlarged sectional views of the connective arrangement according to the present invention corresponding to the positions shown in FIGS. 3A, 3B and 3C, respectively.
Figure 4B:
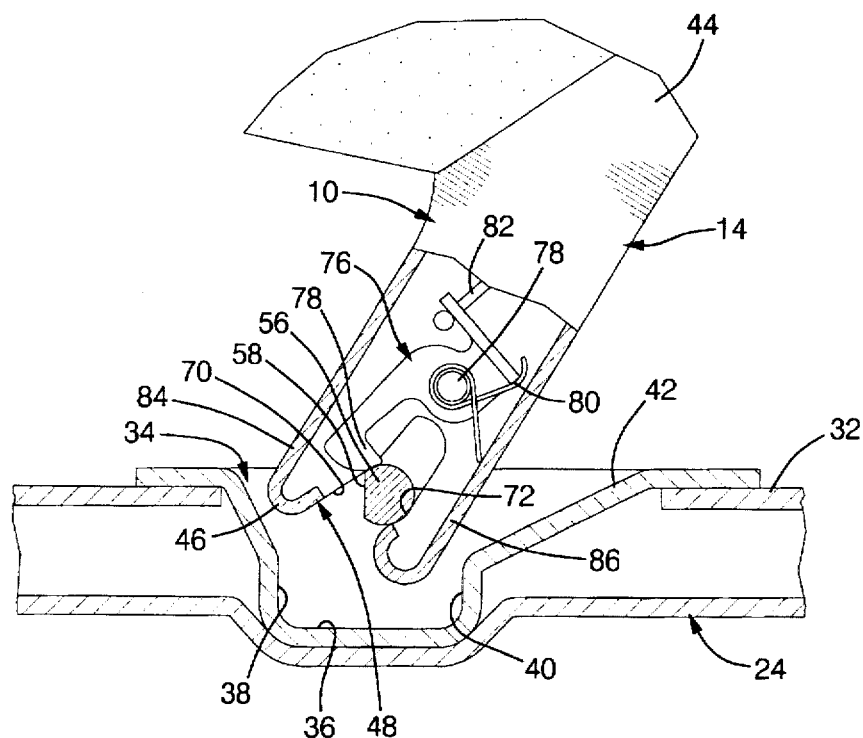
Figure 4C:
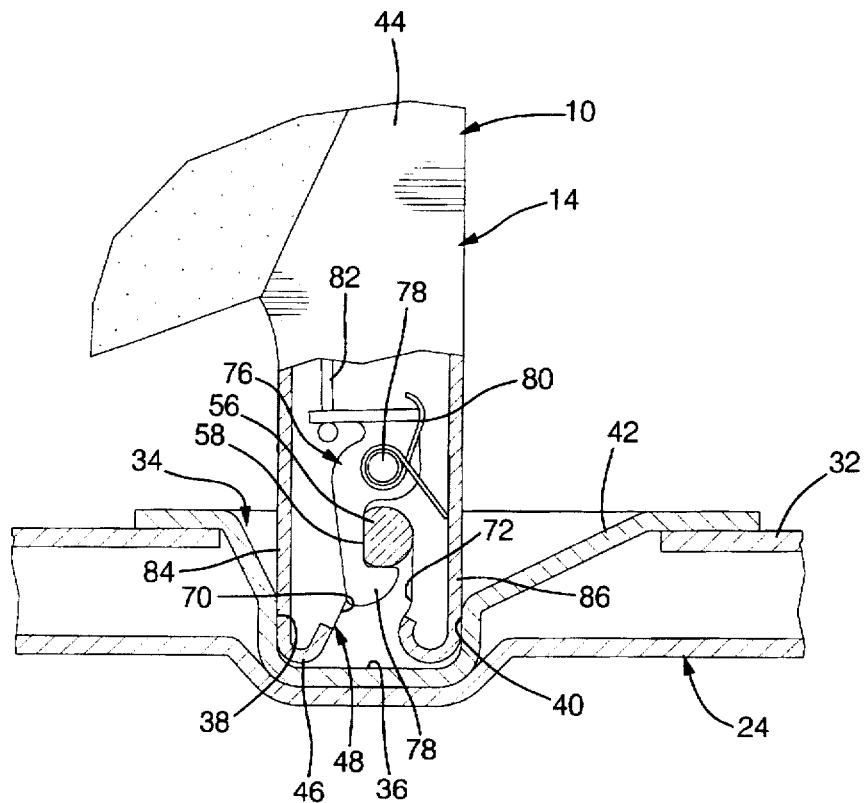
Figure 5:
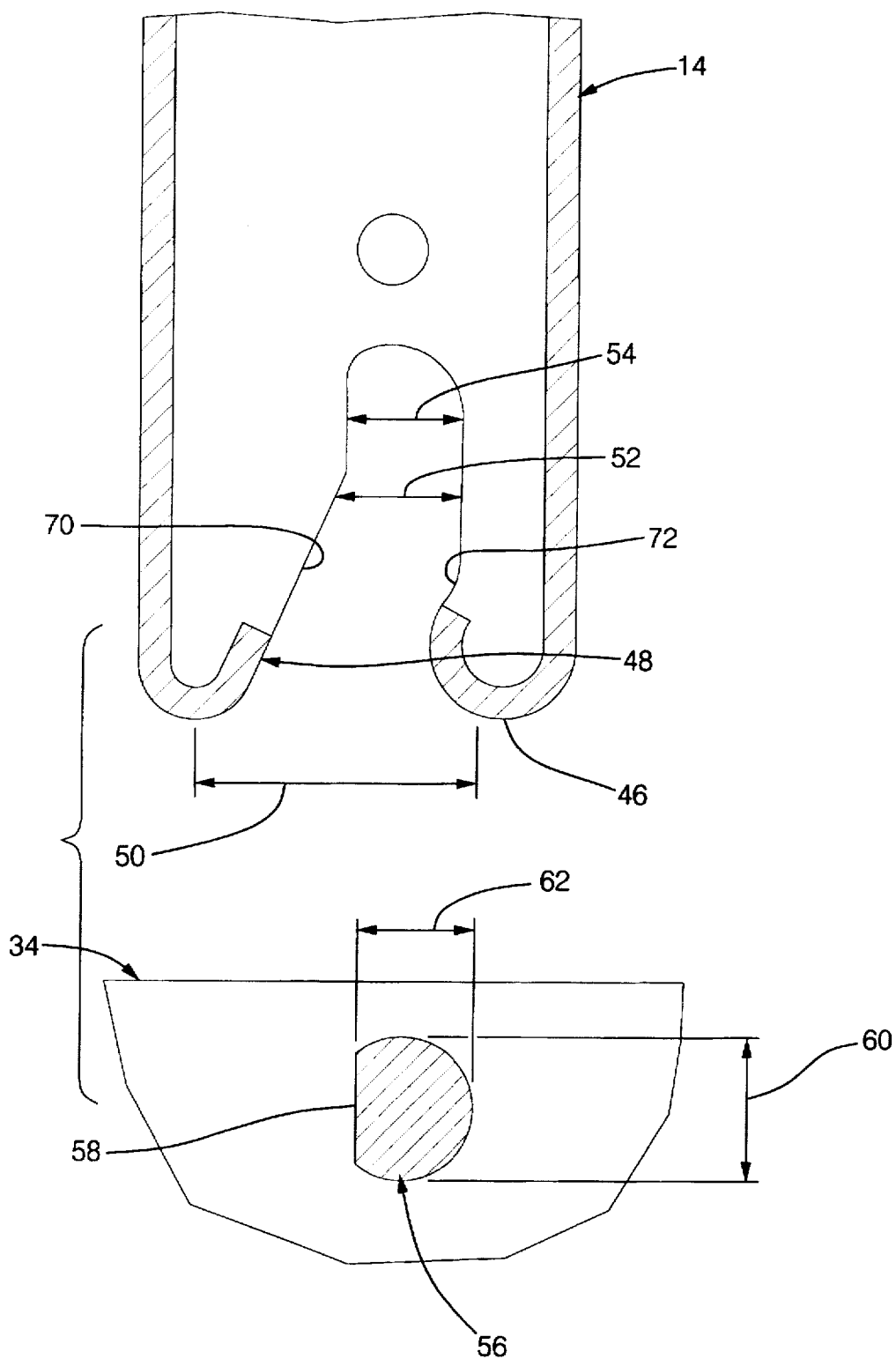
FIG. 5 is a partial side elevational view of a front leg shown in FIGS. 1 through 4C with portions removed for clarity of illustration.

When it is desired to move the seat 7 to a storage position of FIG. 3C, the seat back 12 is folded downwardly and the rear legs 13 are released from the cross pin 20. Upon pivoting upward (FIG. 3B), the cross pin 56 can now pass through the neck 52 of the slot 48, allowing the cross pin 56 to enter into the capture section 54. The front legs 14 also have pivotally connected thereto a latch arm 76, biased as shown in the figures in a counterclockwise direction around a pin 78 by a spring 80. An operator-controlled pull cable 82, which is manipulatable by a latch system as described in Bosworth et al 08/231,631, may be utilized to control such operation. The latch arm 76 has a finger 78 which hooks around the flat end of the cross pin 56 to lock it in the capture section 54 (see FIG. 5). The leg 14 lateral ends 84 and 86 are aligned with side walls 38 and 40 to provide lateral support to maintain the vehicle seat 7 in an upright storage position. The alignment or close positioning of lateral end 84 with the side wall 38, plus the contact of the pin flat 58 in the capture section 54 straight sections, provides double assurance against rearward seat movement. To release the seat to allow it to return to its normal seating position, pull cable 82 is manipulated, causing the latch arm 76 to act against the biasing spring 80. Simple pivotal movement of the seat 7 clockwise as shown in FIG. 4C to the position shown in FIG. 4B will eventually bring the vehicle seat back to a position for re-engagement with the vehicle floor 24.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An arrangement for connecting a vehicle seat to a vehicle in at least two positions, the arrangement comprising:

a floor having a first surface;

a cross pin fixed with respect to the vehicle floor first surface, the cross pin having a cross section with a first larger width and a second smaller width;

a chair leg with a first end connected to the vehicle seat, the chair leg also having a second end with a slot, the slot having a first end wider than the cross pin first width, the slot also having a neck and further having a closure section divided away from the slot first end by the neck, the closure section having a dimension less than the cross pin first width and greater than the cross pin second width; and a lock arm with a finger for locking on to the pin about the second width to entrap the pin in the closure section of the slot, wherein in a normal first seating position the seat leg is positioned to place the cross pin in close proximity to the neck of the slot and in a second fold-up storage position wherein the seat leg is held in a second position extending more vertically upward than in the first position by the latch locking on to the second width of the cross pin.

2. A connective arrangement as described in claim 1 further including the floor having a pocket positioned lower than the first surface of the floor and the cross pin is within the pocket.

3. A connective arrangement as described in claim 2 wherein the pocket has a base and the pocket has a first generally perpendicular wall projecting upward to laterally support the second leg when the second leg is in the second position.

4. A connective arrangement as described in claim 3 wherein the pocket has a second generally perpendicular wall projecting upward to laterally support the second leg when the second leg is in the second position.

5. A connective arrangement as described in claim 2 wherein the pocket has a ramp wall which is inclined with respect to the first surface and is closely adjacent to the second leg.

6. A connective arrangement as described in claim 1 wherein the lock arm is spring biased.

7. A connective arrangement as described in claim 1 wherein the cross pin has a generally circular cross section with a flat section.

8. An arrangement for connecting a vehicle seat to a vehicle in at least two positions, the seat having a first normal seating position and a second storage position, the arrangement comprising:

a floor having a first surface;

a pocket having a base position lower than the floor, the pocket having first and second generally perpendicular walls projecting outward from the base and the second wall having a ramp inclined upward toward the floor first surface;

a cross pin fixed with respect to the vehicle floor adjacent the pocket, the cross pin having a generally circular cross section with a flat, the cross pin having a first larger diameter and a second, generally smaller diameter;

a chair leg with a first end connected to the vehicle seat, the chair leg having a second end, the chair leg second end having a slot having a first end wider than the cross pin first diameter, the slot also having a neck and the slot also having a closure section separated from the first end by the neck, the closure section having a diameter closely adjacent to that of the cross pin second diameter and less than the cross pin first diameter; and a lock arm with a finger for locking on to the pin to entrap the pin in the closure section of the slot, wherein in the first position the seat leg is positioned to place the cross pin in close proximity to the neck of the slot and in the second storage position the seat leg is held in a second position with the finger locking on to the second diameter of the slot on the flat of the cross pin, and wherein the second leg is laterally supported by the first and second walls of the pocket.

9. A vehicle seat having a first normal seating position and a second, generally upright storage position comprising:

a vehicle seat cushion frame;

a first leg connected to the seat cushion frame having a selectively actuatable latch connecting with a first cross pin of a vehicle floor when the seat is in the normal seating position and releasable from the vehicle floor when the seat is in a second storage position;

a second vehicle leg having a first end connected to the seat frame and a second end with a slot, the slot having a first end wider than a first width of a second cross pin fixed to the vehicle floor, the slot also having a neck and the slot having a closure section separated from the slot first end by the neck, the slot closure section having a width less than the cross pin first width and greater than a cross pin second width which is less than the cross pin first width, and the leg having a spring-actuated lock arm with a finger for locking on to the second width of the cross pin to entrap the cross pin within the closure section of the front leg slot and wherein in a normal seating position, the second seat leg is positioned to place the cross pin first width in close proximity to the neck of the cross pin slot and wherein the seat leg is held in a second, generally upright position by the latch locking on to the second diameter of the cross pin when the seat is in the second storage position.

* * * * *